United States Patent
Fu et al.

(10) Patent No.: US 12,079,973 B2
(45) Date of Patent: Sep. 3, 2024

(54) ELECTRONIC DEVICES AND CORRESPONDING HYBRID METHODS OF LOW LIGHT IMAGE ENHANCEMENT

(71) Applicant: Motorola Mobility LLC, Chicago, IL (US)

(72) Inventors: Zhicheng Fu, Naperville, IL (US); Yunming Wang, Buffalo Grove, IL (US); Chao Ma, Evanston, IL (US); Joseph Nasti, Chicago, IL (US); Hong Zhao, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 481 days.

(21) Appl. No.: 17/408,075

(22) Filed: Aug. 20, 2021

(65) Prior Publication Data

US 2023/0036222 A1    Feb. 2, 2023

Related U.S. Application Data

(60) Provisional application No. 63/226,444, filed on Jul. 28, 2021.

(51) Int. Cl.
  *G06T 5/92*     (2024.01)
  *G06T 3/4046*   (2024.01)
  *G06T 3/4053*   (2024.01)

(52) U.S. Cl.
  CPC .............. *G06T 5/92* (2024.01); *G06T 3/4046* (2013.01); *G06T 3/4053* (2013.01); *G06T 2207/20081* (2013.01); *G06T 2207/20084* (2013.01)

(58) Field of Classification Search
  None
  See application file for complete search history.

(56) References Cited

U.S. PATENT DOCUMENTS 9,414,037 B1 *  8/2016  Solh ........................ H04N 23/76
9,894,298 B1 *  2/2018  Solh ........................ H04N 23/45
(Continued)

FOREIGN PATENT DOCUMENTS

CN      112884668 A  *  6/2021

OTHER PUBLICATIONS

R. B. Shashipreeth, R. I. Minu and S. S. Priya, "Low light Image Enhancement using DCE-Net aided by Pack and Unpack operations," 2021 6th International Conference on Communication and Electronics Systems (ICCES), Coimbatre, India, 2021, pp. 1124-1127, doi: 10.1109/ICCES51350.2021.9489104.*

(Continued)

*Primary Examiner* — Jiangeng Sun
(74) *Attorney, Agent, or Firm* — Philip H. Burrus, IV

(57) ABSTRACT

A hybrid method of low light image enhancement in an electronic device comprises downsampling a high resolution, low light image to obtain a low resolution, low light image and inputting the low resolution, low light image into a low light enhancement model of a deep neural network to obtain a low resolution, enhanced image where semantic information such as true colors, edges, and brightness level are recovered. The high resolution, low light image, the low resolution, low light image, and the low resolution, enhanced image are each input into a mathematical model that performs upsampling and super-resolution tasks to generate a high resolution, enhanced image.

20 Claims, 8 Drawing Sheets

(56) References Cited

U.S. PATENT DOCUMENTS

| | | |
|---|---|---|
| 10,861,134 B2 | 12/2020 | Li |
| 2006/0017773 A1 | 1/2006 | Sheraizin et al. |
| 2008/0267525 A1 | 10/2008 | Dai et al. |
| 2009/0046952 A1 | 2/2009 | Ben-Ezra et al. |
| 2009/0274385 A1 | 11/2009 | Zhu et al. |
| 2020/0258195 A1 | 8/2020 | Chuang et al. |
| 2020/0387750 A1 | 12/2020 | Shcherbinin et al. |
| 2021/0125036 A1 | 4/2021 | Tremblay et al. |
| 2021/0133932 A1 | 5/2021 | Lee et al. |
| 2021/0201456 A1 | 7/2021 | Miao et al. |

OTHER PUBLICATIONS

M Fan, W Wang, W Yang, J Liu, "Integrating Semantic Segmentation and Retinex Model for Low-Light Image Enhancement", MM '20: The 28th ACM International Conference on Multimedia, Oct. 12-16, 2020, Seattle, WA, USA.*

Ace, Ethan, "Testing Low Light Vs Image Quality", Published online Jan. 7, 2013 at https://ipvm.com/reports/how-lowering-light-levels-impact-quality.

Youssef, Abdou, "Image Downsampling and Upsampling Methods", Department of EECS—The George Washington University; Published in 2007; https://www2.seas.gwu.edu/~ayoussef/papers/ImageDownUpSampling-CISST99.pdf.

* cited by examiner

ELECTRONIC DEVICES AND CORRESPONDING HYBRID METHODS OF LOW LIGHT IMAGE ENHANCEMENT

CROSS REFERENCE TO PRIOR APPLICATIONS

This application claims priority and benefit under 35 U.S.C. § 119(e) from U.S. Provisional Application No. 63/226,444, filed Jul. 28, 2021, which is incorporated by reference for all purposes.

BACKGROUND

Technical Field

This disclosure relates generally to electronic devices, and more particularly to electronic devices having image capture devices.

Background Art

Mobile electronic communication devices, such as mobile telephones, smart phones, gaming devices, and the like, have become ubiquitous. These devices are used for a variety of purposes, including voice and video telecommunications, sending and receiving text and multimedia messages, Internet browsing, electronic commerce, and social networking. Many are equipped with imagers that can be used to capture images. It would be advantageous to have improved devices and corresponding methods to adapt performance, thereby making the image capture process more efficient and of higher quality.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
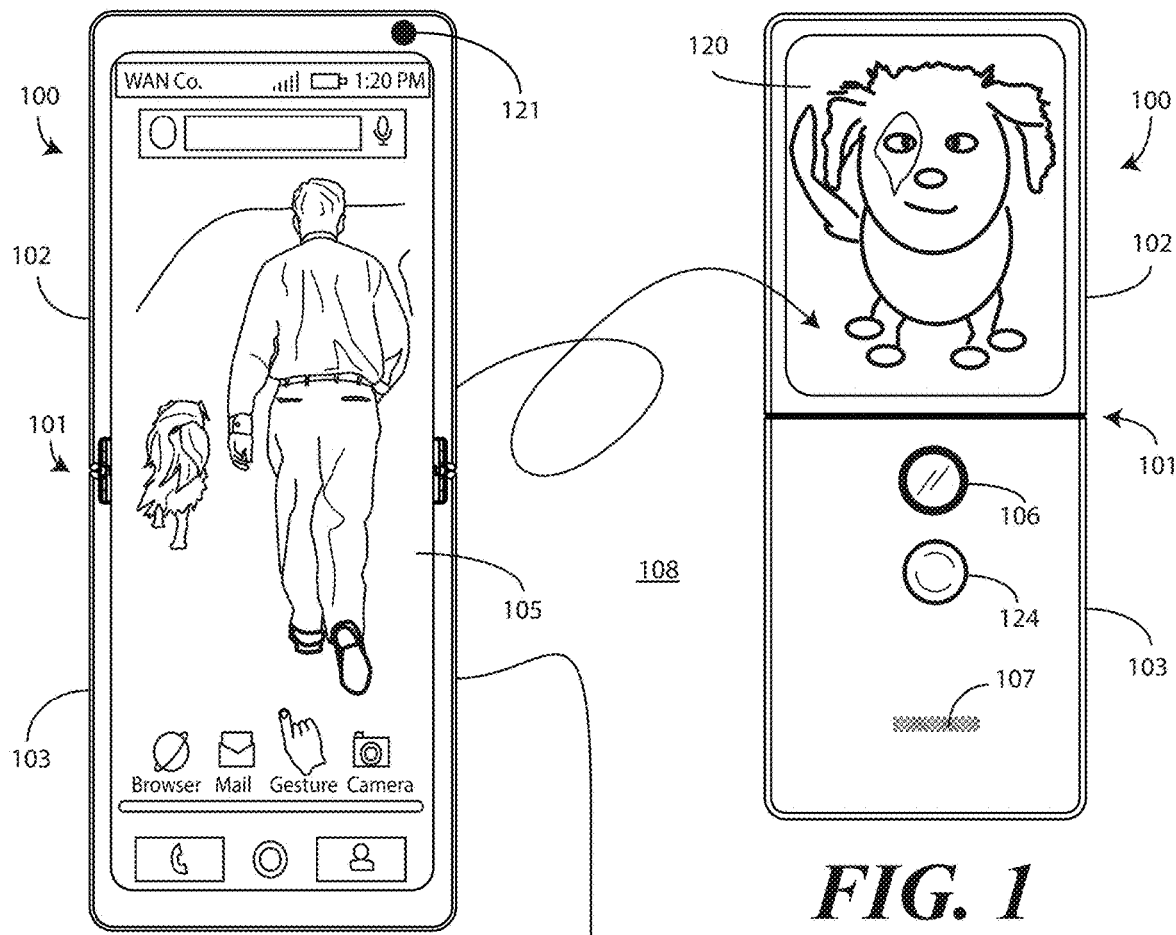
FIG. 1 illustrates one explanatory electronic device in accordance with one or more embodiments of the disclosure.
Figure 1:
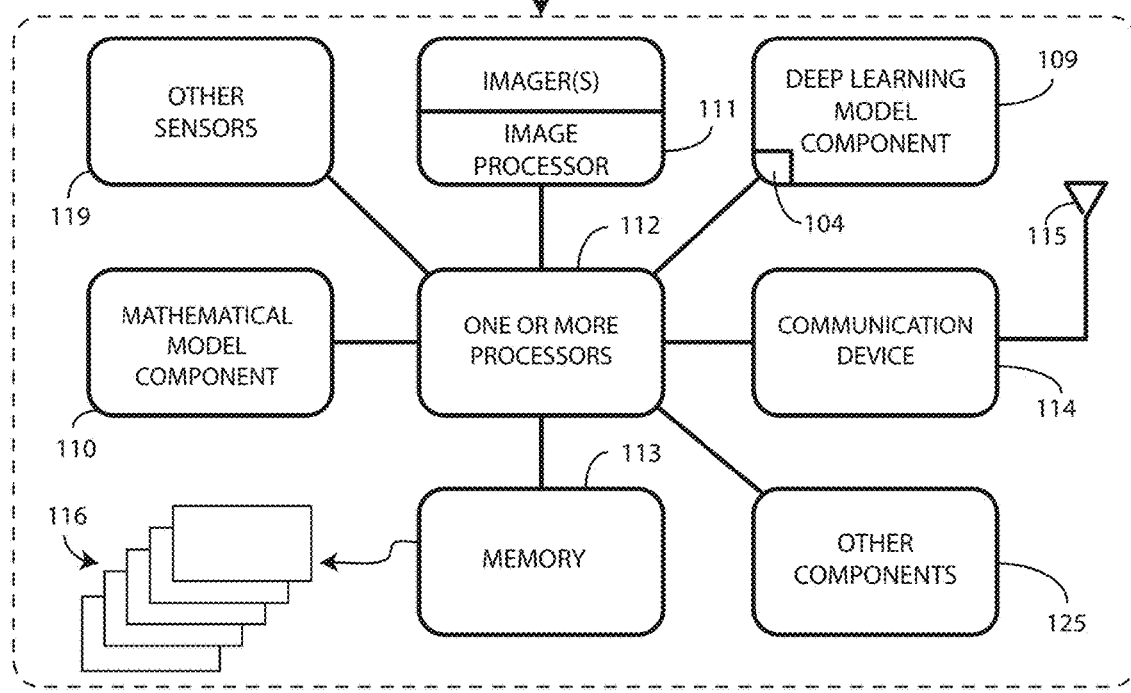

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to processing high resolution, low light images with a hybrid process combining a low light enhancement model of a deep neural network trained through deep learning of semantic enhancement for images photographed in a low light environment with a sharpness-preserving mathematical model to optimize a maximum semantic recovery from the high resolution, low light images while using a minimum processor loading within a predefined low light enhancement process duration time. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of generating a high resolution, enhanced image from a high resolution, low light image by downsampling the high resolution, low light image to obtain a low resolution, low light image that is input into a low light enhancement model of a deep neural network component while the high resolution, low light image, the low resolution, low light image, and an output of the low light enhancement model of the deep neural network component are all input into a mathematical joint upsampling model component as described herein. The non-processor circuits may include, but are not limited to, a radio receiver, a radio transmitter, signal drivers, clock circuits, power source circuits, and user input devices. As such, these functions may be interpreted as steps of a method to perform making usage of the low light enhancement model of the deep neural network component and making use of the sharpness-preserving mathematical joint upsampling model in a hybrid processing system to generate a high resolution, enhanced image that improves image quality while ensuring real-time processing and minimal processor loading within a predefined low light enhancement process duration time.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

While most mobile electronic communication devices include at least one imager, capturing high quality, semantic rich images continued to be a challenging task. This is especially true for portable electronic devices such as smartphones and tablets. Not only do these devices not have the large optics of their larger single lens reflex and professional video counterparts, but their ability to digitally process images is limited by their finite processing and energy storage capacity resources. While a computer running a massive neural network with an unlimited amount of time may be able to process a low light image captured by a single lens reflex camera with massive optics that capture large amounts of light to obtain a relatively high quality image, small electronic devices such as smartphones, laptops, and tablet computers do not have the luxury of this vast processing power and unlimited energy supply. In a smartphone for example, processing images with even a modest neural network can compromise the performance of other features (receiving calls, for example) due to processor loading. Additionally, users often want to take pictures using smartphones and tablets very quickly. They generally do not want to wait six, seven, or ten seconds to see a captured image.

This presents a dilemma for the designer of small electronic devices having imagers. On the one hand, using the entire processing bandwidth of the processor to obtain a high quality image disrupts the other features of the device and causes large delays between the capture of the image and the presentation of a processed image. By contrast, using only a quick mathematical model to process images, which is very fast and only loads the processor lightly, results in an image of sometimes unsatisfactory image quality, albeit in a short amount of time.

Advantageously, embodiments of the disclosure provide a solution to this dilemma that employs a hybrid method that utilizes a relatively small low light enhancement model of a deep neural network to recover missing semantic details from low light images such as true colors, edges, and brightness level. In parallel, the hybrid system utilizes a sharpness-preserving mathematical model to preform super-resolution tasks on a predicted image generated by the low light enhancement model of the deep neural network. By combining the low light enhancement model of the deep neural network with the sharpness-preserving mathematical model, this hybrid process delivers better image quality than either technique alone while ensuring real-time processing that occurs within a predefined low light enhancement process duration time.

Advantageously, the amount of processing in the low light enhancement model of the deep neural network, balanced against the amount of processing in the sharpness-preserving mathematical model can be used to optimize a maximum semantic feature recovery from a high resolution, low light image using a minimum processor loading within a predefined low light enhancement process duration time. For devices having faster and larger processors, more processing can occur in the low light enhancement model of the deep neural network. For devices having smaller and slower processors, less processing can occur in the low light enhancement model of the deep neural network to optimize the low light image enhancement process as a function of device design constraints and limitations. Adjusting the workload occurring in the deep neural network as a function of device processor capability allows optimization of the system while maintaining real-time image processing performance for real time image presentation applications such as when the imager is being used as a view finder.

In one or more embodiments, a hybrid method for low light image enhancement comprises capturing, with an imager, a high resolution, low light image. Illustrating by example, the high resolution, low light image may comprise a 1440 pixel by 1080 pixel image captured in an environment having a light level of less than ten lux.

In one or more embodiments, the low light image enhancement process then includes using one or more processors of the electronic device to downsample the high resolution, low light image to obtain a low resolution, low light image. The one or more processors use a low light enhancement model of a deep neural network to process the low resolution, low light image to obtain a low resolution, enhanced light image. By downsampling the high resolution, low light image prior to inputting the same into the low light enhancement model of the deep neural network, the artificial intelligence component trained by deep learning has a smaller amount of data to process. Accordingly, this allows recovery of semantic details from a low resolution, low light image that can be performed on the processor of a portable electronic device without overly taxing the processor's resources. When optimizing the system, the amount of downsampling can be selected as a function of the processor's capabilities and the other functional demands of the electronic device.

The one or more processors then generate a high resolution, enhanced image using a sharpness-preserving mathematical model that utilizes three inputs, namely, the high resolution, low light image, the low resolution, low light image, and the low resolution, enhanced light image. For example, the sharpness-preserving mathematical model can generate matrices linking the low resolution, low light image and the low resolution, enhanced light image, and can then scale those matrices and apply them to the high resolution, low light image to generate the high resolution, enhanced image. The generation of these matrices, which is quick and fast when the low resolution, low light image input into the low light enhancement model of the deep neural network and the low resolution, enhanced image output from the low light enhancement model of the deep neural network are input into the mathematical model, can quickly translate the semantics recovered from the low resolution version of the image captured by the imager to the high resolution version. In one or more embodiments, the one or more processors use the mathematical model to scale the two determined two-dimensional transformational matrices linking pixels in the low resolution, low light image to pixels in the low resolution, enhanced image to have a spatial dimension equal to that of the high resolution, low light image. The mathematical model then simply performs a quick multiplication and addition to efficiently transfer the recovered semantics from the low light enhancement model of the deep neural network to the high resolution, low light image to generate a high resolution, enhanced image.

By using this hybrid model, the best aspects of the low light enhancement model of a deep neural network and the sharpness-preserving mathematical model are utilized to improve image quality while ensuring real-time processing requirements and durations are met. The hybrid system utilizes the low light enhancement model of a deep neural network to recover semantic details from the high resolution, low light image such as true colors, edges, and brightness level. The hybrid system utilizes the sharpness-preserving mathematical model to preform super-resolution tasks on the low resolution, enhanced light image generated by the low light enhancement model of the deep neural network. The hybrid mode can impressively enhance low light images taken in environments having light levels of less than ten lux.

Advantageously, embodiments of the disclosure enable users of devices configured in accordance with embodiments of the disclosure to experience high quality images captured in low light environments such as night time scenes, cloudy environments, and foggy environments. By adjusting how much processing occurs in the low light enhancement model of the deep neural network (based on different processor power of corresponding device), embodiments of the disclosure can be adapted to both high tier and low tier consumer electronics having different processor capabilities, feature sets, and processing speeds. Embodiments of the disclosure can be extended from low light still image capture to other applications such as smart Internet-of-things image and video processing. Embodiments of the disclosure facilitate image analysis, computer vision, and pattern recognition by bringing out previously "hidden" information in images captured in low light environments. Other advantages will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, laptop computers, Internet-of-things devices, gaming devices, multimedia capture devices, and so forth. Still other types of electronic devices can be configured in accordance with embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, a partially open position, and an open position as shown in FIG. 1.

While the illustrative electronic device 100 of FIG. 1 includes a hinge 101, in other embodiments electronic devices configured in accordance with embodiments of the disclosure will not include a hinge 101. Accordingly, in another embodiment the electronic device 100 of FIG. 1 includes a single housing.

The illustrative electronic device 100 of FIG. 1 at least one display. In this embodiment, a first display 105, also referred to as the interior display or the rear-facing display, is concealed when the first device housing 102 is pivoted about the hinge 101 relative to the second device housing 103 to a closed position. This first display 105 is then revealed when the first device housing 102 is pivoted about the hinge 101 relative to the second device housing 103 from the closed position to an axially displaced open position.

In one or more embodiments, the electronic device 100 also includes at least a second display 120. In the illustrative embodiment of FIG. 1, the second display 120 can be referred to as an exterior display, quick view display, or front-facing display, as the second display 120 is exposed both when the first device housing 102 and the second device housing 103 are pivoted about the hinge 101 to the closed position, the axially displaced open position, or any position therebetween. In one or more embodiments, each of the first display 105 and the second display 120 is a high-resolution display.

In one or more embodiments, either or both of first display 105 and/or the second display 120 can be touch-sensitive. Where this is the case, users can deliver user input to one or both of the first display 105 or the second display 120 by delivering touch input from a finger, stylus, or other objects disposed proximately with the first display 105 or the second display 120.

In the illustrative embodiment of FIG. 1, since the first display 105 spans the hinge 101, it is configured to be flexible. For instance, in one embodiment the first display 105 is configured as an organic light emitting diode (OLED) display fabricated on a flexible plastic substrate. This allows the first display 105 to be flexible so as to deform when the first device housing 102 pivots about the hinge 101 relative to the second device housing 103. However, it should be noted that other types of displays would be obvious to those of ordinary skill in the art having the benefit of this disclosure. Illustrating by example, in other embodiments conventional, rigid displays can be disposed to either side of the hinge rather than using a flexible display. Where the electronic device 100 has only a single device housing and no hinge, a single rigid display may span a major surface of the electronic device 100, and so forth.

In one or more embodiments, the first display 105 is configured as an OLED constructed on flexible plastic substrates to allow the first display 105 to bend in accordance with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the first display 105 may be formed from multiple layers of flexible material such as flexible sheets of polymer or other materials. In this illustrative embodiment, the first display 105 is coupled to the first device housing 102 and the second device housing 103. Accordingly, the first display 105 spans the hinge 101 in this embodiment.

Features can be incorporated into the first device housing 102 and/or the second device housing 103. Examples of such features include imager 106, which in this embodiment is an exterior or front facing imager. The imager 106, which can be any number of types of image capture devices, has its lens situated such that it is directed away from a user who is holding the electronic device 100 and facing the first display 105. This allows the imager 106 to receive light directed toward the electronic device 100 from a location in front of the user when the user is holding the electronic device 100 and facing the first display 105.

Instead of, or alternatively in addition to, the imager 106, a second, rear facing imager 121 can be positioned on the interior side of the electronic device 100 to receive light and images directed toward the first display 105. When a user is holding the electronic device 100 and looking at the first display, this second, rear facing imager 121 can be used to take a "selfie" without turning the electronic device 100 around. While two imagers are shown in the illustrative embodiment of FIG. 1, it should be noted that embodiments of the disclosure can include additional imagers mounted in different positions that can be actuated to capture images from different angles.

Other examples of features that can be incorporated into the first device housing 102 and/or the second device housing 103 include an optional speaker port 107. While shown situated on the exterior of the electronic device 100 in FIG. 1, the optional speaker port 107 could also be placed on the interior side as well. In this illustrative embodiment, a user interface component 124, which may be a button or touch sensitive surface, can also be disposed along the exterior side of the second device housing 103. As noted, any of these features shown being disposed on the exterior side of the electronic device 100 could be located elsewhere, such as on the interior side or minor sides in other embodiments.

A block diagram schematic of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In one or more embodiments, the electronic device 100 also includes an image processor 111 that processes light signals received by the imager 106 or the second imager 121 once those signals are converted into binary data. Illustrating by example, in one or more embodiments the image processor 111 can detect whether one or more persons are within an environment 108 of the electronic device 100. For instance, the image processor 111 can detect actuation of the imager 106 and/or second imager 121 and/or image capture operations. The image processor 111 can also detect actuation of an image capture application, thereby allowing the image processor 111 to preform preview operations where objects within the field of view of the imager 106 or the second imager 121 are captured, converted to data, and presented on any of the display 105, the second display 120, or combinations thereof.

The image processor 111 can perform other functions as well. For example, the image processor 111 can include a facial recognition module that analyzes images captured by the imager 106 and/or second imager 121 to identify facial characteristics present in those images captured by the imager 106 and/or second imager 121. In one or more embodiments, in response to the image processor 111 identifying these or other image capture operations, the one or more processors 112 can determine whether one or more persons are situated within the environment 108 of the electronic device 100, as well as where these one or more processors are located relative to the electronic device 100.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present content offerings including images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

The one or more processors 112 can employ the modules 116 or other instructional code to be operable with the imager 106, the second imager 121, and/or the image processor 111 as well. Illustrating by example, as will be explained below the one or more processors 112, the image processor 111, or combinations thereof can be instructed to generate a high resolution, enhanced image from a high resolution, low light image using a hybrid image enhancement technique by combining a low light enhancement model of a deep neural network component 109 trained through deep learning of semantic enhancement for images captured or photographed in low light environments with a mathematical joint upsampling model component 110. For instance, a downsampler 104 can downsample a high resolution, low light image to obtain a low resolution, low light image. The one or more processors 112 and/or image processor 111 can input the low resolution, low light image into the low light enhancement model of the deep neural network component 109 to generate a low resolution, enhanced image. The one or more processors 112 and/or image processor 111 can then input each of the high resolution, low light image, the low resolution, low light image, and the low resolution, enhanced image into the mathematical joint upsampling model component for processing.

In one or more embodiments, the low light enhancement model of the deep neural network component 109 recovers missing semantic details from the input low resolution, low light image. Examples of such missing semantic details include true colors, edges, and brightness level. Other semantic details can be recovered as well.

In one or more embodiments, the low light enhancement model of the deep neural network component 109 uses an artificial intelligence model component that stored in the memory 113 and is trained through deep learning of semantic enhancement for images photographed in a low light environment. As will be appreciated by those of ordinary skill in the art having the benefit of this disclosure, training the training of such a neural network can include the process of providing the deep neural network component 109 with low light images and corresponding ground truth images such that the deep neural network component 109 can perform a process of determining one or more parameters by using training data to properly recover semantic information associated with the low light images and found in the ground truth images using processes such as mapping, classification, regression, clustering, and other techniques. Semantic parameters of the deep neural network component 109 may be recorded in synapses or neurons of the low light enhancement model of the deep neural network component 109.

In one or more embodiments, the low light enhancement model of the deep neural network component 109 is trained using supervised learning in which the machine learning infers functions from a control and a conditioned input. For instance, ground truth images can be input as controls while identical, but low light images, are input as conditioned inputs. The low light enhancement model of the deep neural network component 109 may perform regressions and other processes on the inputs to predict output classifications or other functions to predict outputs. While supervised learning is a preferred method for training the low light enhancement model of the deep neural network component 109 in one or more embodiments, other techniques for training could be used as well, including unsupervised learning, semi-supervised learning, and reinforcement learning. Other training techniques will be obvious to those of ordinary skill in the art having the benefit of this disclosure.

When deep learning is used to train the low light enhancement model of the deep neural network component 109, this means that a large amount of training data are provided to the low light enhancement model of the deep neural network component 109 before the same is allowed to be operational in the field. This deep training, while requiring a large amount of initial data, produces highly effective results when low resolution, low light images are delivered as inputs in practice.

For instance, the low light enhancement model of the deep neural network component 109 can be trained using a supervised learning process where pairs of low light images and corresponding "correct" or "ground truth" images are delivered to the low light enhancement model of the deep neural network component 109 so that the low light enhancement model of the deep neural network component 109 is trained to recover—to the extent possible—any and all semantic details that may be obscured, missing, or not readily visible in a low-light image. Once trained, the low light enhancement model of the deep neural network component 109 learns to recover these missing semantic details effectively. When, for example, a low resolution, low light image is input into the low light enhancement model of the deep neural network component 109, the same generates a low resolution, enhanced image as an output that includes these initially missing, but now recovered, semantic details.

The mathematical joint upsampling model component 110 then uses a combination of three inputs, namely, the high resolution, low light image, the low resolution, low light image that was also input into the low light enhancement model of the deep neural network component 109, and the low resolution, enhanced image that is output from the low light enhancement model of the deep neural network component 109. The mathematical joint upsampling model component 110 takes these three inputs and makes use of a sharpness-preserving mathematical model to preform super-resolution tasks on the high resolution, low light image using information taken from the improvements in the low resolution, enhanced image output by the low light enhancement model of the deep neural network component 109 compared to the low resolution, low light image input into the low light enhancement model of the deep neural network component 109. This can include scaling one or more two-dimensional transformational matrices mathematically linking pixels in the low resolution, low light image to other pixels in the low resolution, enhanced image, upsampling those two-dimensional transformational matrices, and applying the upsampled two-dimensional transformational matrices to the high resolution, low light image to generate a high resolution, enhanced image.

The fact that the low light enhancement model of the deep neural network component 109 and the mathematical joint upsampling model component 110 are combined in this manner to create a hybrid image enhancement system allows for greatly improved image quality in low-light situations while still ensuring real-time processing. Illustrating by example, when a high resolution, low light image is 1440×1080 pixels in resolution, this hybrid mechanism can generate greatly improved image resolution, color, and light levels in about forty-five to forty-eight milliseconds using a standard, commercially available smartphone chipset as the one or more processors 112. In one or more embodiments, the downsampler 104 downsamples the high resolution, low light image by a factor of three to five times to obtain the low resolution, low light image to achieve this performance when using the system of FIG. 3 and the method of FIG. 4. However, by selecting which processing occurs in the low light enhancement model of the deep neural network component 109 and which occurs in the mathematical joint upsampling model component 110, the quality improvement can be maximized while minimizing the loading on the one or more processors 112 for other hardware constructs given a predefined low light enhancement process duration time, such as about sixty-six milliseconds for a 15 Hertz refresh rate, as will be described below with reference to FIG. 7 as well. Embodiments of the disclosure have been demonstrated to provide impressive enhancement for high resolution, low light images having associated therewith a light level of less than ten lux.

In one or more embodiments, when the imager 106 or second imager 121 captures a high resolution, low light image, such as a 1440×1080 pixel image, be it in response to user input requesting an image be captured such as a button press or user actuation target touch, from a preview mode where images captured are continually presented on the display 105, the second display 120, or in response to other conditions when the imager 106 and/or the second imager 121 are operational, the one or more processors 112 and/or image processor 111 generate a high resolution, enhanced image having the same spatial resolution using this hybrid enhancement system where the low light enhancement model of the deep neural network component 109 is combined with the mathematical joint upsampling model component 110.

To illustrate how this occurs, once light signals incident on the imager 106 and/or the second imager 121 are captured in low light environments in the form of high resolution, low light image by converting those light signals to operable data, in one or more embodiments the downsampler 104 downsamples the high resolution, low light image and inputs the low resolution, low light image into both the low light enhancement model of the deep neural network component 109 and the mathematical joint upsampling model component 110. In one or more embodiments, downsampler 104 downsamples the high resolution, low light image by a factor of between three and five times. Accordingly, in one or more embodiments the high resolution, low light image has a spatial resolution of between three and five times the spatial resolution of both the low resolution, low light image and the low resolution, enhanced image.

The one or more processors 112 and/or the image processor 111 then input the low resolution, low light image into both the low light enhancement model of the deep neural network component 109 and the mathematical joint upsampling model component 110. The high resolution, low light image is also input to the mathematical joint upsampling model component 110, as is the low resolution, enhanced image once the low light enhancement model of the deep neural network component 109 generates it from the low resolution, low light image using its deep learning of semantic enhancement of images photographed in a low light environment.

In one or more embodiments, the one or more processors 112 and/or image processor 111 utilize the mathematical joint upsampling model component 110 to scale one or more two-dimensional transformational matrices mathematically linking pixels in the low resolution, low light image to other pixels in the low resolution, enhanced image to have a spatial resolution equal to that of the high resolution, low light image.

For instance, when the downsampler 104 downsamples the high resolution, low light image by three to five times to generate the low resolution, low light image, the mathematical joint upsampling model component 110 will calculate an estimated two two-dimensional transformational matrices α and β that have the same spatial resolution as do the low resolution, low light image and, when generated by the low light enhancement model of the deep neural network component 109, the low resolution, enhanced image. The mathematical joint upsampling model component 110 then resizes the α matrix and β matrix to have the same spatial resolution as does the high resolution, low light image. The one or more processors 112 and/or image processor 111 then use the mathematical joint upsampling model component 110 to apply the α matrix and the β matrix after scaling to original pixels of the high resolution, low light image to generate the high resolution, enhanced image. In one or more embodiments, the one or more processors 112 and/or image processor 111 then present the high resolution, enhanced image on a display to a user, examples of which include the display 105 and/or the second display 120.

Benefits of using this hybrid approach to low light image enhancement include the fact that low light image quality can be greatly improved while maintaining real-time processing capabilities without overloading the one or more processors 112 and/or image processor 111. Additionally, the use of the hybrid approach to low light image enhancement enables users to experience high quality image presentations even when conditions are low light conditions, such as those that occur when the environment 108 of the electronic device 100 is darkly lit, cloudy, foggy, and so forth. When optimized in accordance with the method of FIG. 7 below, the hybrid approach can be used in both low tier and high tier devices that operate with simple or powerful processors. The hybrid system provides a fast and low-processor loading system that is flexible and that can be used in a variety of real-time low light image enhancement applications, including those used in conjunction with Internet-of-things devices, video processing, and other applications. The hybrid system using the low light enhancement model of the deep neural network component 109 and the mathematical joint upsampling model component 110 also facilitates vision and pattern recognition in low light images by using the low light enhancement model of the deep neural network component 109 to recover hidden semantics and image information when the environment 108 of the electronic device 100 is a low light environment.

The electronic device 100 can include other components as well. For example, the electronic device 100 can include one or more sensors 119. The one or more sensors 119 may include a microphone, an earpiece speaker, a loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, geometric sensors, motion sensors, altitude sensors, a light sensor, and one or more switches. Touch sensors may used to indicate whether any of the user actuation targets present on the display 105 or display 120 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 125 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
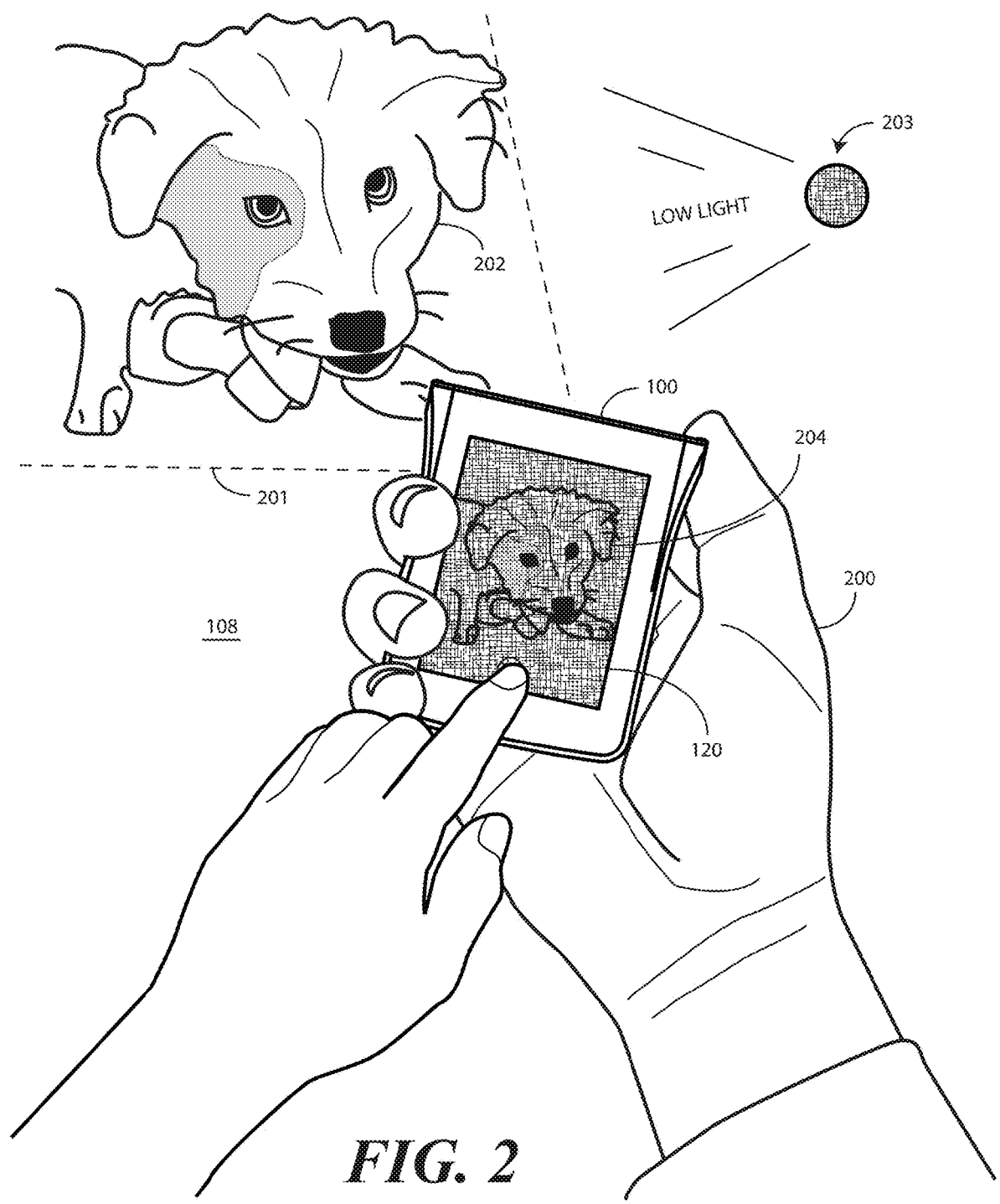
FIG. 2 illustrates one or more explanatory method steps in accordance with one or more embodiments of the disclosure.

Turning now to FIG. 2, illustrated therein is a user 200 of an electronic device 100 configured in accordance with one or more embodiments of the disclosure using an imager (106) to capture one or more images 201 of a subject 202 in an environment 108 where there are low light conditions 203. In one or more embodiments, the low light conditions 203 constitute a light level of less than ten lux, such that any image captured by the imager (106) has associated therewith a light level of less than ten lux. While embodiments of the disclosure work well to improve images 201 having a light level of less than ten lux, embodiments of the disclosure still work to recover colors, contrasts, brightness, sharpness, and other semantic information when the environment 108 is more brightly lit as well.

As shown in FIG. 2, the user 200 is causing the imager (106) to capture the one or more images 201 by touching a user actuation target presented on the second display 120 of the electronic device 100. While this is one mechanism by which the imager (106) will capture the light signals in its field of view to capture the one or more 202 by converting those light signals into operable data, it should be noted that the imager (106) may capture images in other ways as well. Illustrating by example, when the imager (106) is operating in a preview mode as a viewfinder for the user 200, the imager (106) may capture consecutive images at a rate of 15 Hertz, 30 Hertz, 60 Hertz, or another rate for presentation on a display, e.g., the second display 120, of the electronic device 100. Alternatively, the imager (106) may capture successive images when recording video as well. Accordingly "capture" of an image as used herein means a conversion of light signals to operable data suitable for storage in a storage device of the electronic device 100, such as memory (113).

In one or more embodiments, when the imager (106) captures the one or more images 201 when the low light conditions 203 exist within the environment of the electronic device 100, they are captured as high resolution, low light images. One example of such a high resolution, low light image 204 is presented for illustration purposes on the second display 120 of the electronic device 100. It should be noted that in practice, the one or more processors (112) of the electronic device 100 would not present the high resolution, low light image 204 to the user 200. Instead, they would present—in real time—a high resolution, enhanced image generated in accordance with the systems and methods described herein. The high resolution, low light image 204 is shown in FIG. 2 for explanatory purposes to provide a beginning point for a hybrid method of performing low light image enhancement in the electronic device 100 using a low light enhancement model of the deep neural network component (109) combined with a mathematical model, such as that defined by the mathematical joint upsampling model component (110), to obtain the high resolution, enhanced image.

Figure 3:
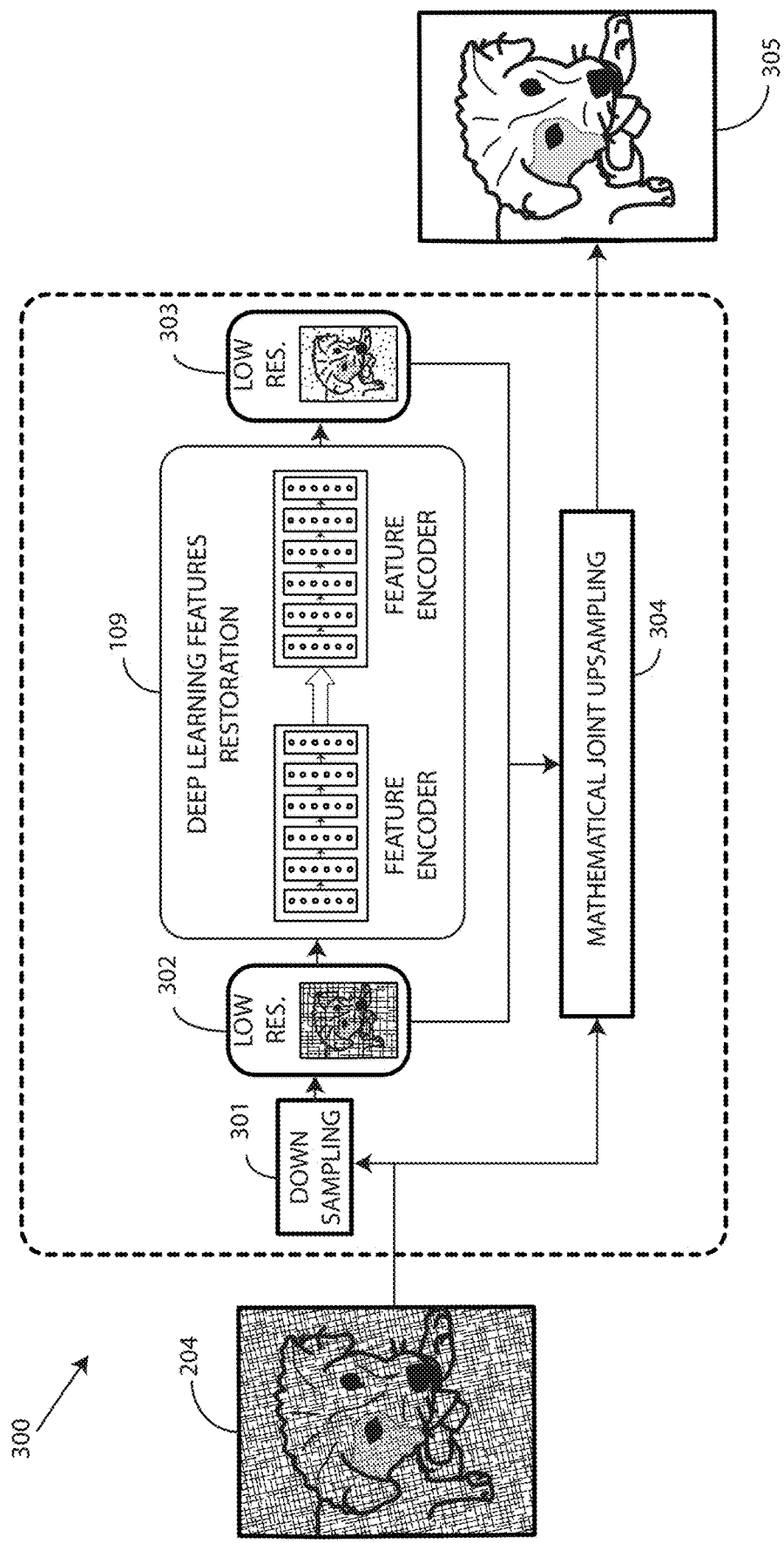
FIG. 3 illustrates one explanatory low light image enhancement system in accordance with one or more embodiments of the disclosure.

Turning now to FIG. 3, illustrated therein is a signal flow diagram illustrating one explanatory embodiment of a hybrid method for low light image enhancement. Once the imager (106) captures the high resolution, low light image 204, the downsampler (104) downsamples 301 the high resolution, low light image 204 to obtain a low resolution, low light image 302. If, for example, the high resolution, low light image 204 is a 1440×1080 pixel image, in one or more embodiments the low resolution, low light image 302 has a spatial resolution downsampled by a factor of between three and five in one or more embodiments.

The low light enhancement model of the deep neural network component 109 then processes the low resolution, low light image 302 to recover missing semantic details from the low resolution, low light image 302. Examples of such semantic details include true colors of the low resolution, low light image 302, edges of the low resolution, low light image 302, brightness levels of the low resolution, low light image 302, noise reduction in the low resolution, low light image 302, contrast in the low resolution, low light image 302, and so forth. Other examples of semantic information suitable for recovery using a low light enhancement model of the deep neural network component 109 will be obvious to those of ordinary skill in the art having the benefit of this disclosure. As a result of this processing, the low light enhancement model of the deep neural network component 109 generates a low resolution, enhanced image 303 with enhanced semantic details. In one or more embodiments, the spatial resolution of the low resolution, low light image 302 and the low resolution, enhanced image 303 are the same.

A mathematical model 304, one example of which is the mathematical joint upsampling model component (110) of FIG. 1, then generates a high resolution, enhanced image 305 from three separate inputs: the high resolution, low light image 204, the low resolution, low light image 302, and the low resolution, enhanced image 303. In one or more embodiments, the mathematical model 304 comprises a sharpness-preserving mathematical model that performs super-resolution tasks on the high resolution, low light image 204 using one or more transformational matrices calculated by the mathematical model 304 from the low resolution, low light image 302 and the low resolution, enhanced image 303. In one or more embodiments, this includes performing an upsampling process using the inputs when generating the high resolution, enhanced image 305, where the mathematical model 304 resizes these transformational matrices from those having spatial resolutions corresponding to the low resolution, low light image 302 and low resolution, enhanced image 303 to those having other spatial resolutions corresponding to the high resolution, low light image 204. In so doing, this results in the high resolution, low light image 204 and the high resolution, enhanced image 305 having the same spatial resolution. If the high resolution, low light image 204 is 1440×1080 pixels, the high resolution, enhanced image 305 will have the same spatial resolutions, and so forth.

In one or more embodiments the two dimensional transformational matrices comprise an α matrix and a β matrix. The mathematical model 304 can generate an α matrix and a β matrix each having a spatial resolution equal to that of both the low resolution, low light image 302 and the low resolution, enhanced image 303. In one or more embodiments, each pixel in the low resolution, enhanced image 303 is arranged according to a transformation function having the formula:

$$c(i,j)=\alpha(i,j)*b(i,j)+\beta(i,j) \quad (\text{EQ. 1})$$

where:
c(i,j) represent pixels in the low resolution, enhanced image;
α(i,j) represent values of the α matrix;
β(i,j) represent values of the β matrix; and
b(i,j) represent pixels in the low resolution, low light image corresponding to the c(i,j) pixels of the low resolution, enhanced image.

The mathematical model 304 then resizes the α matrix and the β matrix to generate a scaled α matrix and a scaled β matrix each having spatial resolutions equal to that of the high resolution, low light image 204. This resizing performs an upsampling function of the semantic information recovered by the low light enhancement model of the deep neural network component 109 so that the result can be applied to the high resolution, low light image 204. Illustrating by example, in one or more embodiments the mathematical model 304 then applies the scaled α matrix and the scaled β matrix to the high resolution, low light image 204 to generate the high resolution, enhanced image 305 using the formula:

$$d(i,j)=\alpha\_\text{scaled}(ij)*a(i,j)+\beta\_\text{scaled}(i,j) \quad (\text{EQ. 2})$$

where:
d(i,j) represent pixels in the high resolution, enhanced image;
α_scaled(i,j) represent values of the scaled α matrix;
β_scaled(ij) represent values of the scaled β matrix; and
a(i,j) represent pixels in the high resolution, low light image. This results in the high resolution, low light image 204 having the same spatial resolution as that of the high resolution, enhanced image 305.

Figure 4:
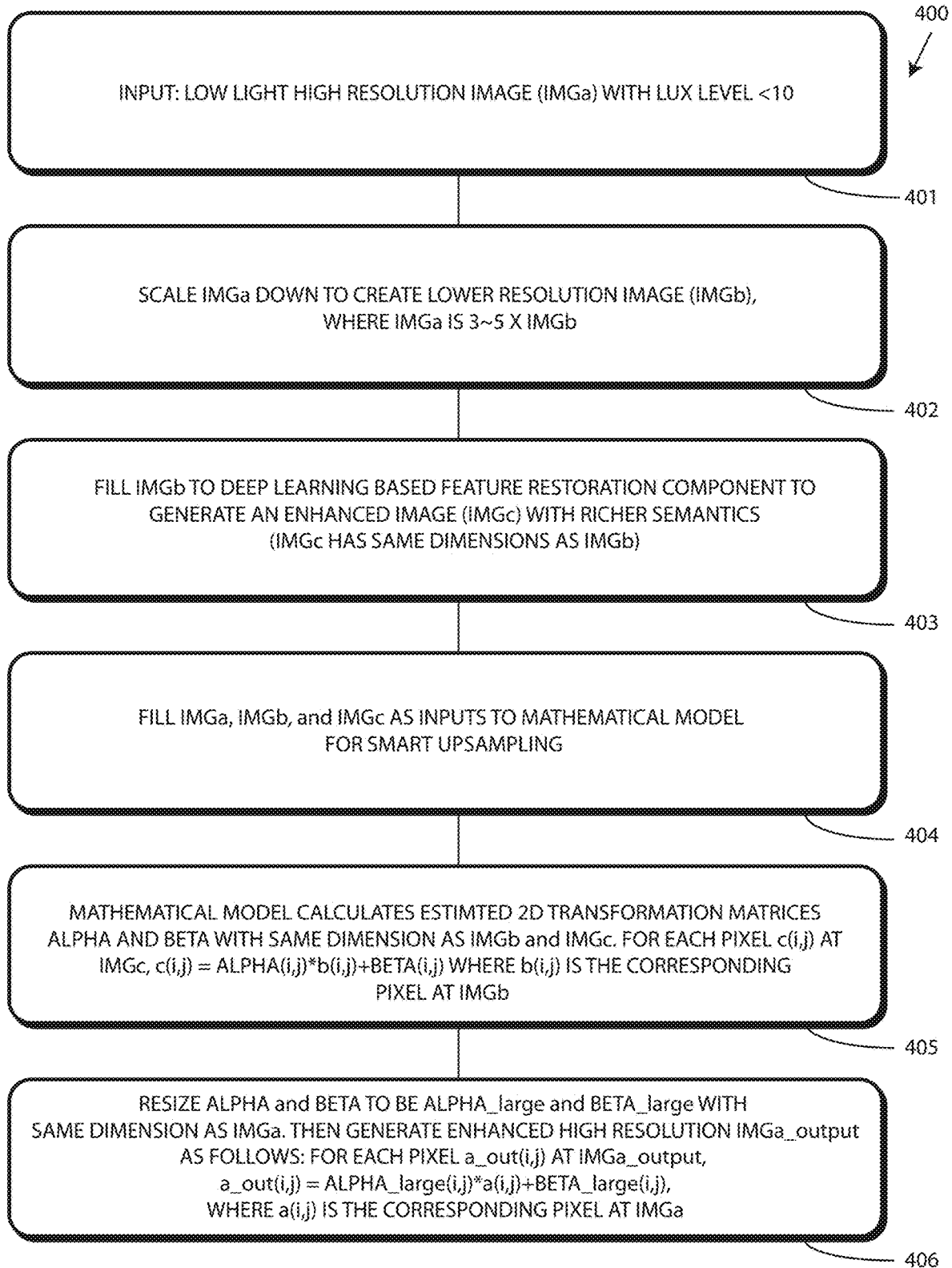
FIG. 4 illustrates one explanatory method in accordance with one or more embodiments of the disclosure.

The method performed by the system 300 of FIG. 3 is summarized in FIG. 4. Turning now to FIG. 4, at step 401 an imager captures a high resolution, low light image. In one or more embodiments, the high resolution, low light image captured at step 401 has associated therewith a light level of less than ten lux, although the method 400 of FIG. 4 works for low light images having greater light levels as well. In one or more embodiments, the high resolution, low light image has a spatial resolution of 1440×1080 pixels, although the high resolution, low light image can have other spatial resolutions as well.

At step 402, the high resolution, low light image is downsampled to obtain a low resolution, low light image. In one or more embodiments, the result of this downsampling is that the high resolution, low light image has a spatial resolution of between three and five times the spatial resolution of the low resolution, low light image.

At step 403, the low resolution, low light image is processed by a low light enhancement model of a deep neural network to obtain a low resolution, enhanced image. In one or more embodiments, the low light enhancement model of the deep neural network is trained through deep learning of semantic enhancement for images photographed in a low light environment using a supervised learning process as previously described. In one or more embodiments, the low resolution, enhanced image includes richer semantics, examples of which include true colors, edges, and brightness level, than does the low resolution, low light image. In one or more embodiments, the low resolution, low light image and the low resolution, enhanced image have the same spatial resolution.

At step 404, the following inputs are delivered to a mathematical model, which in one embodiment is sharpness-preserving mathematical model: the high resolution, low light image, the low resolution, low light image, and the low resolution, enhanced image.

At step 405, the sharpness-preserving mathematical model calculates an estimated α matrix and an estimated β matrix each having a spatial resolution equal to that of both the low resolution, low light image and the low resolution, enhanced image. In one or more embodiments, the estimated α matrix and the estimated β matrix are calculated from the differences between the low resolution, low light image input into the low light enhancement model of the deep neural network and the low resolution, enhanced image output from the low light enhancement model of the deep neural network. In one or more embodiments, for each pixel c(i,j) of the low resolution, enhanced image, the following equation applies:

$$c(i,j)=\alpha(i,j)*b(i,j)+\beta(i,j) \quad (\text{EQ. 1})$$

where b(i,j) is the corresponding pixel of the low resolution, low light image.

Figure 5:
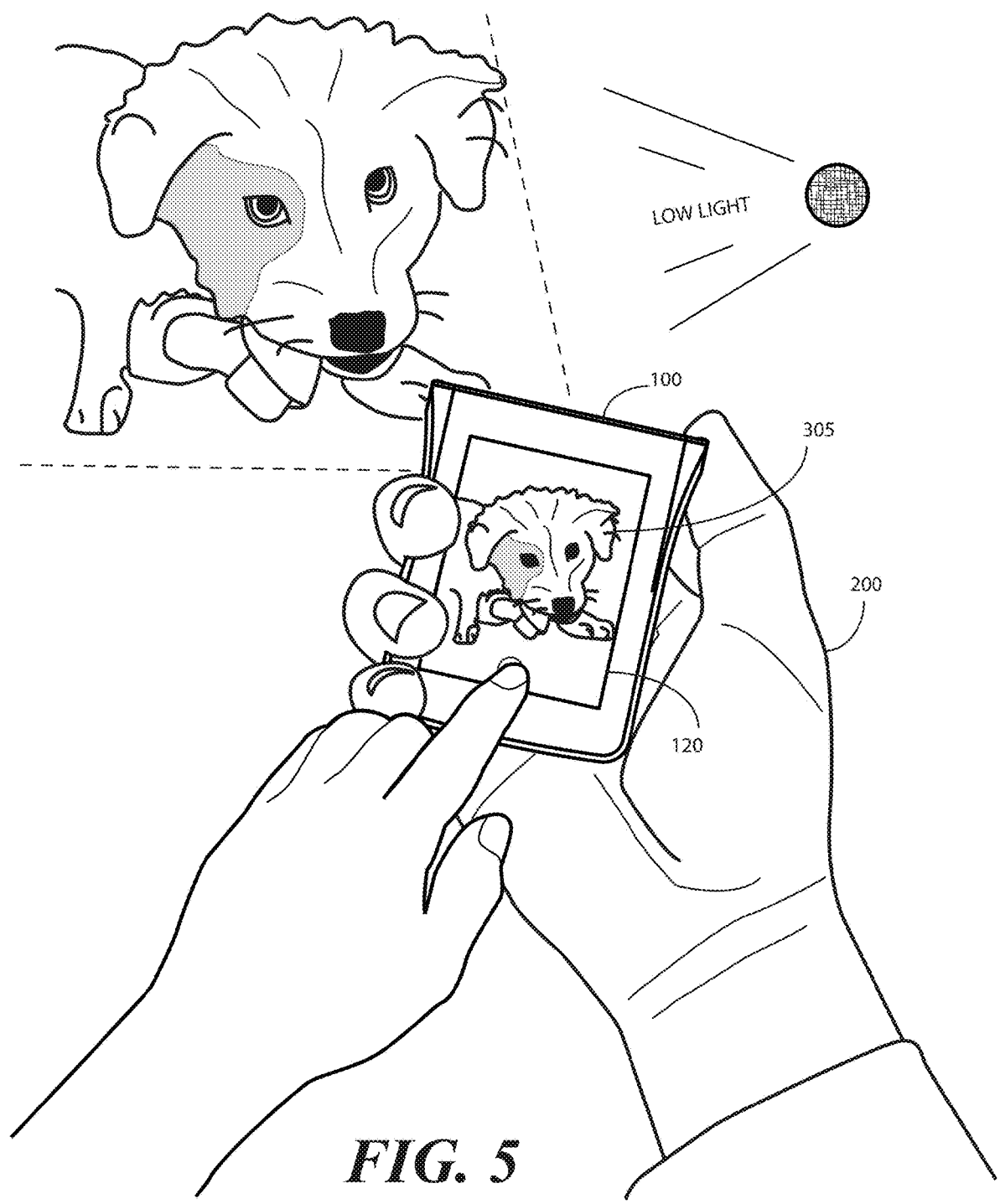
FIG. 5 illustrates one or more embodiments explanatory method steps in accordance with one or more embodiments of the disclosure.

At step 406, the sharpness-preserving mathematical model performs an upsampling process using its inputs by resizing the estimated α matrix and the estimated β matrix by resizing the estimated α matrix and the estimated β matrix to generate a scaled α matrix and a scaled β matrix each having a spatial resolution equal to that of the high resolution, low light image. Using these resized matrices, step 406 comprises generating the high resolution, enhanced image using the following equation for each pixel d(i,j) of the high resolution, enhanced image:

$$d(i,j)=\alpha\_\text{scaled}(ij)*a(i,j)+\beta\_\text{scaled}(i,j) \quad (\text{EQ. 2})$$

where α(i,j) is the corresponding pixel of the high resolution, low light image. As shown in FIG. 5, in one or more embodiments the high resolution, enhanced image 305 on a display, one example of which is the second display 120 of the electronic device 100.

Figure 6:
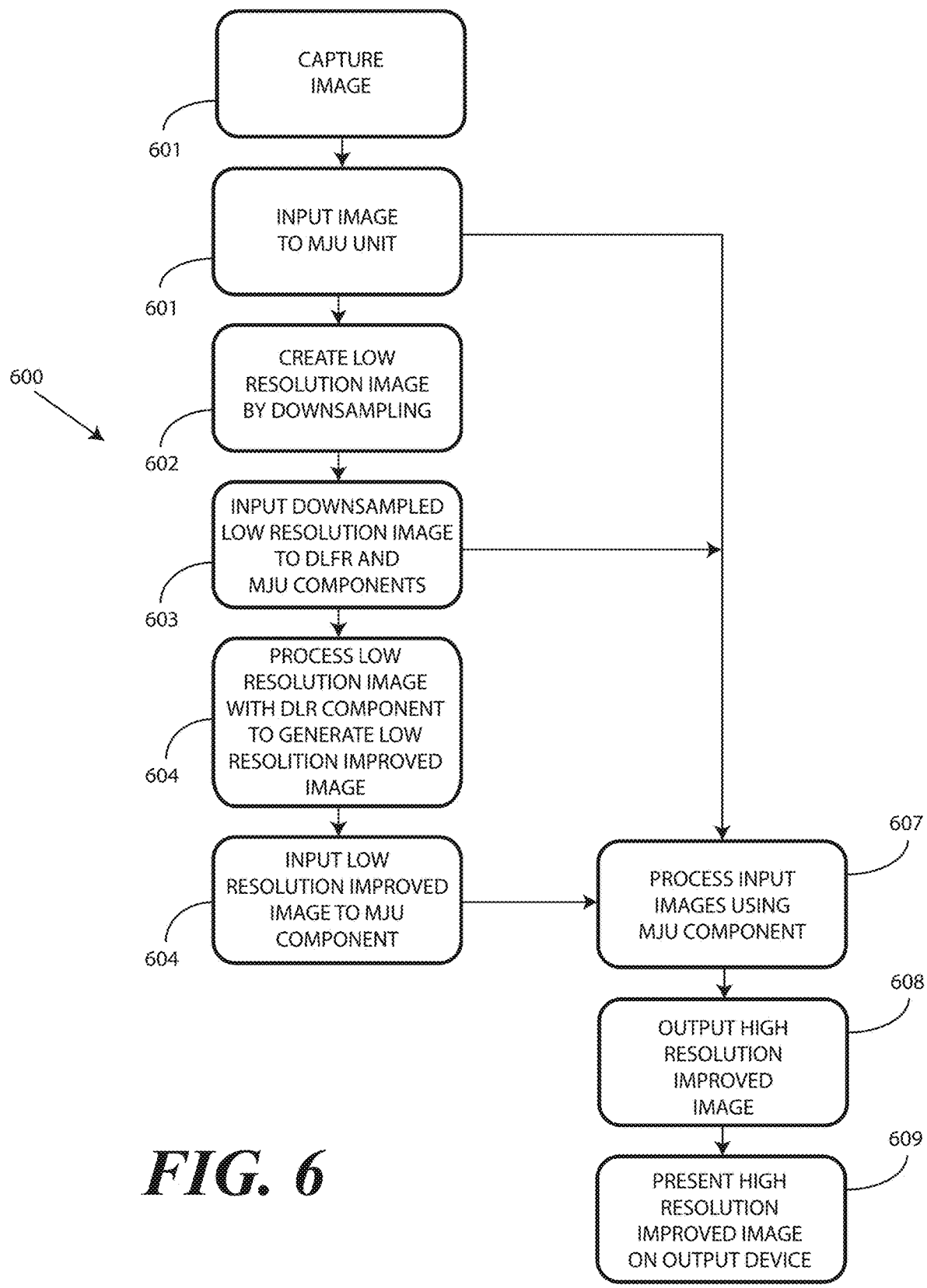
FIG. 6 illustrates another explanatory method in accordance with one or more embodiments of the disclosure.

The hybrid nature of the method (400) of FIG. 4 is illustrated in the method 600 of FIG. 6 where the processing steps occurring in the low light enhancement model of the deep neural network component trained through deep learning of semantic enhancement for images photographed in a low light environment are shown in a separate column from those steps occurring in the mathematical model, one example of which is the mathematical joint upsampling model component described above with reference to FIG. 1.

As before, at step 601 an imager captures a high resolution, low light image. At step 602, one or more processors of an electronic device input the high resolution, low light image to the mathematical model. At step 603, the one or more processors of the electronic device downsamples the high resolution, low light image to obtain a low resolution, low light image. At step 603, the one or more processors of the electronic device input the low resolution, low light image into the deep neural network component.

At step 604, the one or more processors of the electronic device input the low resolution, low light image into the mathematical model. At step 605, the deep neural network component generates a low resolution, enhanced image from the low resolution, low light image. At step 606, the one or more processors of the electronic device input the low resolution, enhanced image to the mathematical model.

At step 607, the mathematical model generates two two-dimensional transformational matrices mathematically linking pixels in the low resolution, low light image to the low resolution, enhanced image. At step 607, the mathematical model also scales the two two-dimensional transformational matrices from the spatial resolution of the low resolution, low light image and low resolution, enhanced image to have another spatial dimension equal to that of the high resolution, low light image. In one or more embodiments, the mathematical model applies the two matrices, after scaling, to the original pixels of the high resolution, low light image to generate the high resolution, enhanced image, which is output at step 608. One or more processors of the electronic device may then present the high resolution, enhanced image to a user on a display at step 609.

Figure 7:
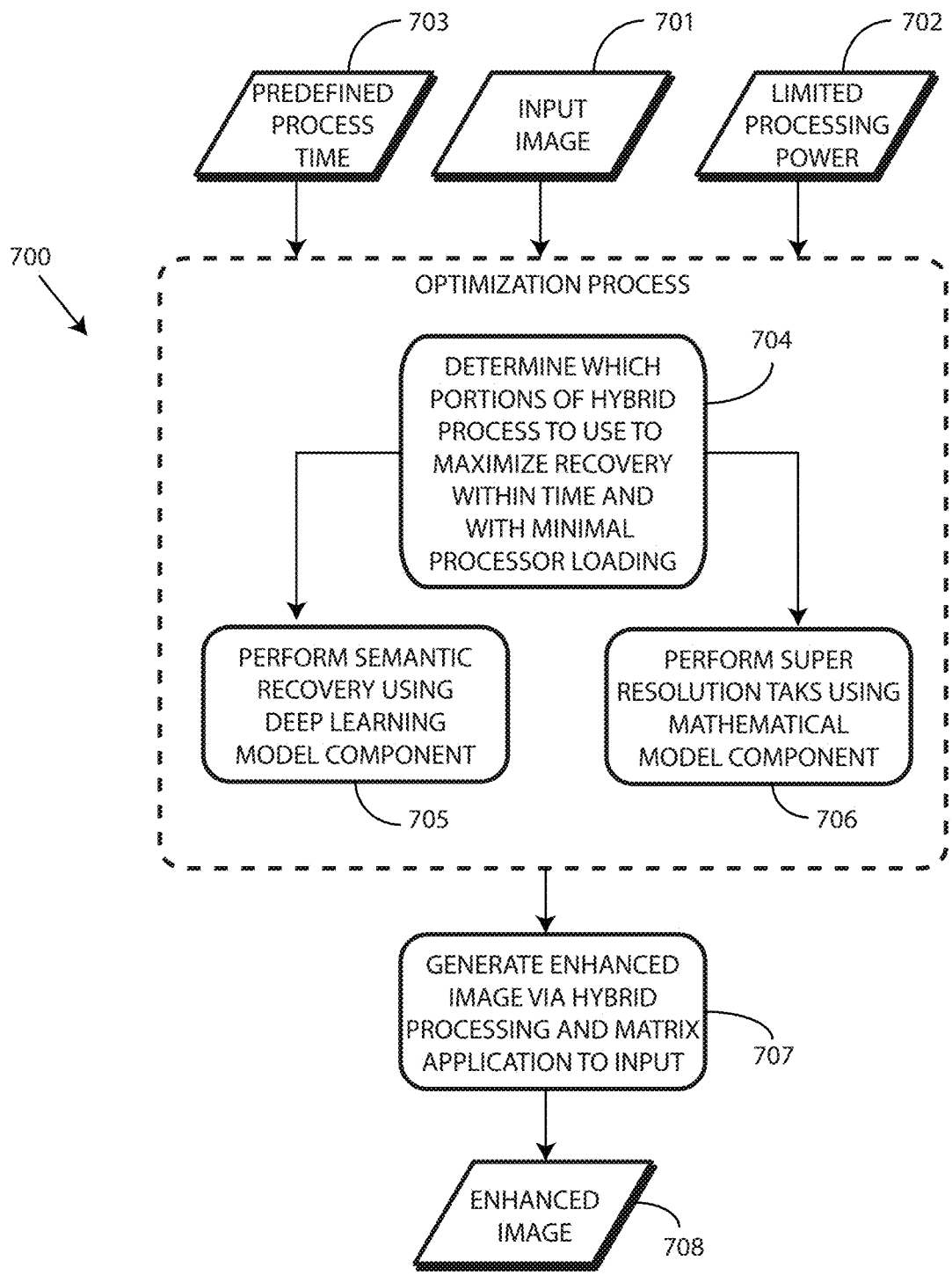
FIG. 7 illustrates still another explanatory method in accordance with one or more embodiments of the disclosure.

Turning now to FIG. 7, illustrated therein is a method 700 of optimizing a low light image enhancement process in accordance with one or more embodiments of the disclosure. Embodiments of the disclosure contemplate that capturing low light images is always a challenging subject, especially when using mobile electronic devices having limited energy storage capabilities, small optical components, and limited processing power. Accordingly, with prior art devices, these low light images suffer from effects such as high noise, low visualization, color distortion, and/or combinations thereof.

While there are known low light enhancement methods that increase brightness and reduce noise, prior art techniques rarely accurately recover true color and other missing semantic details. While some artificial intelligence techniques can recover such details, they cannot be used on mobile devices due to their excessive resource consumption and long processing durations.

As described above, embodiments of the disclosure provide a hybrid system that provides excellent image quality while ensuring real-time processing, even when low light images have associated therewith a light level of less than ten lux. However, embodiments of the disclosure contemplate that portable electronic devices, such as smartphones and tablet computers, come with different capabilities. Lower tier devices may have processors with less processing power, while higher tier devices may have processors with greater processing power, and so forth. Additionally, different designers will want to present high resolution, enhanced images to a user in different durations. A purchaser of a low tier device may be content to wait sixty, seventy, or one hundred milliseconds to see a high resolution, enhanced image using the techniques described herein, while a purchaser of a high tier device may want the same presentation in forty-five or fewer milliseconds to keep preview modes and video capture at high frame rates free of flicker or other distortion. Advantageously, given a predefined low light enhancement process time defined by a designer and a predefined processing capability, the method 700 of FIG. 7 allows a maximum semantic recovery from a high resolution, low light image to occur using a minimum processor loading within the predefined low light enhancement process duration time by balancing what processing occurs in a deep neural network component, which tends to be slower and more processor intensive but better at semantic recovery, and what processing occurs in a mathematical model, which is faster with less processor loading, but which is poorer at semantic recover.

As shown in FIG. 7, when a given set of inputs include a high resolution, low light image 701, a predefined processing capability 702 of a processor used in an electronic device that is defined as a function of the other processes the processor must perform in the electronic device, and a predefined low light enhancement process duration time defined by a designer such as 45, 50, 60, or 66 milliseconds, the method 700 of optimizing a low light enhancement process optimizes a maximum semantic recovery from the high resolution, low light image 701 using a minimum processor loading of the one or more processors of the electronic device within the predefined low light enhancement process duration time 703.

To do this, at step 704 the method 700 determines a first portion of the low light image enhancement process to be performed in the low light enhancement model of the deep neural network component trained through deep learning of semantic enhancement for images photographed in a low light environment. Step 704 also includes determining a second portion of the low light image enhancement process to be performed in a mathematical model, one example of which is a sharpness-preserving mathematical model. By balancing the amount of processing in the low light enhancement model of the deep neural network against the amount of processing in the sharpness-preserving mathematical model, step 704 optimizes the maximum semantic feature recovery from the high resolution, low light image 701 using a minimum processor loading within the given predefined low light enhancement process duration time 703. For devices having faster and larger processors, more processing can occur in the low light enhancement model of the deep neural network. This results in better semantic recovery, albeit with higher processor loading and potentially longer processing times. For devices having smaller and slower processors, more processing can occur in the sharpness-preserving mathematical model to optimize the low light image enhancement process as a function of device design constraints and limitations. While this may result in lower quality, it still results in maximizing semantic information recovery within the predefined low light enhancement process duration time while minimally loading the one or more processors of the electronic device.

At step 705, the method 700 includes performing a first portion of the low light image enhancement process using the low light enhancement model of the deep neural network component trained through deep learning of semantic enhancement for images photographed in a low light environment. In one or more embodiments, step 705 enhances one or more of true colors, edges, or brightness level of the input, which is a low resolution, low light image downsampled from the high resolution, low light image 701 in one or more embodiments.

At step 706, the method 700 includes performing a second portion of the low light image enhancement process using a sharpness-preserving mathematical model. At step 707, the sharpness-preserving mathematical model generates the a high resolution, enhanced image 708 by performing an upsampling process on matrices linking an input and an output of the low light enhancement model and applying the matrices to pixels of the high resolution, low light image 701, as previously described.

Figure 8:
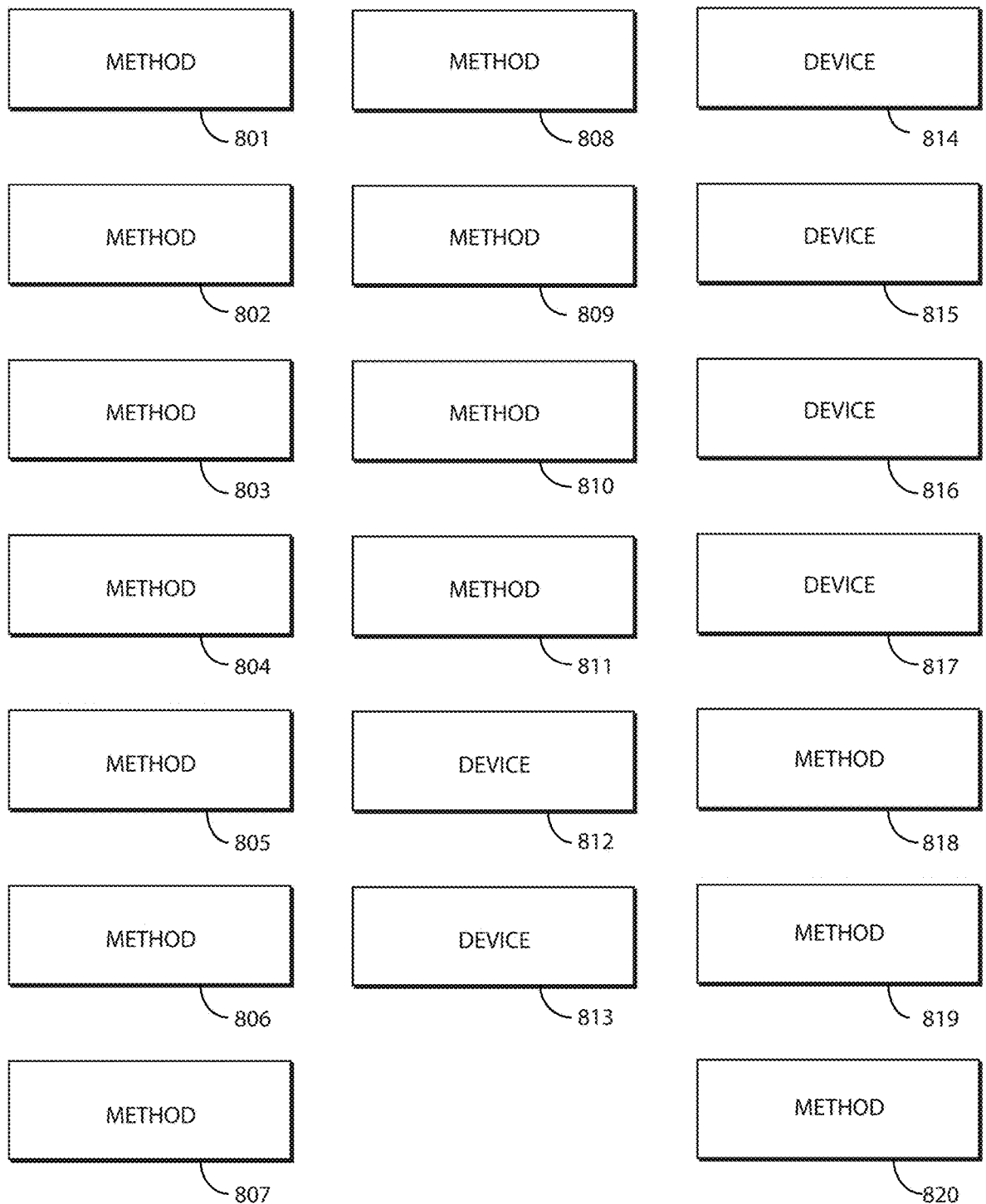
FIG. 8 illustrates one or more embodiments of the disclosure.

Turning now to FIG. 8, illustrated therein are various embodiments of the disclosure. The embodiments of FIG. 8 are shown as labeled boxes in FIG. 8 due to the fact that the individual components of these embodiments have been illustrated in detail in FIGS. 1-7, which precede FIG. 8. Accordingly, since these items have previously been illustrated and described, their repeated illustration is no longer essential for a proper understanding of these embodiments. Thus, the embodiments are shown as labeled boxes.

At 801, a hybrid method for low light image enhancement comprises capturing, with an imager, a high resolution, low light image. At 801, the hybrid method comprises downsampling, with one or more processors operable with the imager, the high resolution, low light image to obtain a low resolution, low light image.

At 801, the hybrid method comprises processing, by the one or more processors using a low light enhancement model of a deep neural network, the low resolution, low light image to obtain a low resolution, enhanced image. At 801, the hybrid process comprises generating, by the one or more processors from a mathematical model, a high resolution, enhanced image from the following inputs: the high resolution, low light image, the low resolution, low light image, and the low resolution, enhanced image.

At 802, the low light enhancement model of a deep neural network of 801 is trained through deep learning of semantic enhancement for images photographed in a low light environment. At 803, the mathematical model of 802 comprises a sharpness-preserving mathematical model. At 804, the sharpness-preserving mathematical model of 803 performs an upsampling process using the inputs when generating the high resolution, enhanced image.

At 805, the sharpness-preserving mathematical model of 804 generates an $\alpha$ matrix and a $\beta$ matrix each having a spatial resolution equal to that of both the low resolution, low light image and the low resolution, enhanced light image. At 806, each pixel in the low resolution, enhanced image of 805 is arranged according to a transformation function having a formula of:

$$c(i,j)=\alpha(i,j)*b(i,j)+\beta(ij) \quad \text{(EQ. 1)}$$

where:
c(i,j) represent pixels in the low resolution, enhanced image;
$\alpha(i,j)$ represent values of the $\alpha$ matrix;
$\beta(i,j)$ represent values of the $\beta$ matrix; and
b(i,j) represent pixels in the low resolution, low light image corresponding to the c(i,j) pixels of the low resolution, enhanced image.

At 807, the sharpness-preserving mathematical model of 805 further resizes the $\alpha$ matrix and the $\beta$ matrix to generate a scaled $\alpha$ matrix and a scaled $\beta$ matrix each having another spatial resolution equal to that of the high resolution, low light image. At 808, the sharpness-preserving mathematical model of 807 generates the high resolution, enhanced image using a formula of:

$$d(i,j)=\alpha\_\text{scaled}(ij)*a(i,j)+\beta\_\text{scaled}(i,j) \quad \text{(EQ. 2)}$$

where:
d(i,j) represent pixels in the high resolution, enhanced image;
$\alpha\_\text{scaled}(i,j)$ represent values of the scaled $\alpha$ matrix;
$\beta\_\text{scaled}(ij)$ represent values of the scaled $\beta$ matrix; and
$\alpha(i,j)$ represent pixels in the high resolution, low light image.

At 809, the high resolution, low light image of 805 has a spatial resolution of between three and five times another spatial resolution of either the low resolution, low light image or the low resolution, enhanced image. At 810, the low resolution, low light image of 809 and the low resolution, enhanced image of 809 have the same spatial resolution. At 811, the high resolution, low light image of 810 has associated therewith a light level of less than ten lux.

At 812, an electronic device comprises an imager capturing a high resolution, low light image. At 812, the electronic device comprises one or more processors operable with the imager.

At 812, the one or more processors generate a high resolution, enhanced image from the high resolution, low light image using hybrid image enhancement by combining a low light enhancement model of a deep neural network component trained through deep learning of semantic enhancement for images photographed in a low light environment that generates a low resolution, enhanced image and a mathematical joint upsampling model component. At 812, the mathematical joint upsampling model component generates the high resolution, enhanced image by downsampling the high resolution, low light image to obtain a low resolution, low light image, inputting the low resolution, low light image into the low light enhancement model of the deep neural network component, and inputting the high resolution, low light image, the low resolution, low light image, and the low resolution, enhanced image into the mathematical joint upsampling model component.

At 813, the electronic device of 812 further comprises a display. At 813, the one or more processors presenting the high resolution, enhanced image on the display.

At 814, the one or more processors of 812 use the mathematical joint upsampling model component to scale two two-dimensional transformational matrices mathematically linking pixels in the low resolution, low light image to other pixels in the low resolution, enhanced image to have a spatial resolution equal to that of the high resolution, low light image.

At 815, the one or more processors of 814 use the mathematical joint upsampling model component to apply the two two-dimensional transformational matrices after scaling to original pixels of the high resolution, low light image to generate the high resolution, enhanced image.

At 816, the high resolution, low light image of 815 has a spatial resolution of between three and five times another spatial resolution of both the low resolution, low light image and the low resolution, enhanced image. At 817, the high resolution, low light image of 816 has associated therewith a light level of less than ten lux.

At 818, a method of optimizing a low light image enhancement process in an electronic device comprises optimizing, using one or more processors of the electronic device, a maximum semantic recovery from a high resolution, low light image using a minimum processor loading of the one or more processors within a predefined low light enhancement process duration time by performing a first portion of the low light image enhancement process using a low light enhancement model of a deep neural network component trained through deep learning of semantic enhancement for images photographed in a low light environment and performing a second portion of the low light image enhancement process using an sharpness-preserving mathematical model.

At 819, the sharpness-preserving mathematical model of 818 generates the a high resolution, enhanced image by performing an upsampling process on matrices linking an input and an output of the low light enhancement model and applying the matrices to pixels of the high resolution, low light image. At 820, the first portion of the low light image enhancement process of 819 enhances one or more of true colors, edges, or brightness level of the input.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A hybrid method for low light image enhancement, the method comprising:
   capturing, with an imager, a high resolution, low light image;
   downsampling, with one or more processors operable with the imager, the high resolution, low light image to obtain a low resolution, low light image;
   processing, by the one or more processors using a low light enhancement model of a deep neural network, the low resolution, low light image to obtain a low resolution, enhanced image; and
   generating, by the one or more processors from a mathematical model, a high resolution, enhanced image from three inputs:
      the high resolution, low light image;
      the low resolution, low light image; and
      the low resolution, enhanced image;
   wherein:
      the low light enhancement model is trained through deep learning of semantic enhancement for images photographed in a low light environment; and
      the mathematical model comprises a sharpness-preserving mathematical model.

2. The hybrid method of claim 1, wherein the low light environment has light levels of less than ten lux.

3. The hybrid method of claim 1, wherein the low light environment comprises one of a nighttime environment, a cloudy environment, or a foggy environment.

4. The hybrid method of claim 1, wherein the sharpness-preserving mathematical model performs an upsampling process using the three inputs when generating the high resolution, enhanced image.

5. The hybrid method of claim 4, wherein the sharpness-preserving mathematical model generates an $\alpha$ matrix and a $\beta$ matrix each having a spatial resolution equal to that of both the low resolution, low light image and the low resolution, enhanced light image.

6. The hybrid method of claim 5, wherein each pixel in the low resolution, enhanced image is arranged according to a transformation function having a formula of:

$$c(i,j)=\alpha(i,j)*b(i,j)+\beta(i,j), \text{ where}$$

$c(i,j)$ represent pixels in the low resolution, enhanced image;
   $\alpha(i,j)$ represent values of the $\alpha$ matrix;
   $\beta(i,j)$ represent values of the $\beta$ matrix; and
   $b(i,j)$ represent pixels in the low resolution, low light image corresponding to the $c(i,j)$ pixels of the low resolution, enhanced image.

7. The hybrid method of claim 5, wherein the sharpness-preserving mathematical model further resizes the $\alpha$ matrix and the $\beta$ matrix to generate a scaled $\alpha$ matrix and a scaled $\beta$ matrix each having another spatial resolution equal to that of the high resolution, low light image.

8. The hybrid method of claim 7, wherein the sharpness-preserving mathematical model generates the high resolution, enhanced image using a formula of:

$$d(i,j)=\alpha\_scaled(i,j)*a(i,j)+\beta\_scaled(i,j), \text{ where:}$$

$d(i,j)$ represent pixels in the high resolution, enhanced image;
   $\alpha\_scaled(i,j)$ represent values of the scaled $\alpha$ matrix;
   $\beta\_scaled(i,j)$ represent values of the scaled $\beta$ matrix; and
   $a(i,j)$ represent pixels in the high resolution, low light image.

9. The hybrid method of claim 5, wherein the high resolution, low light image has a spatial resolution of between three and five times another spatial resolution of either the low resolution, low light image or the low resolution, enhanced image.

10. The hybrid method of claim 9, wherein the low resolution, low light image and the low resolution, enhanced image have equivalent spatial resolutions.

11. The hybrid method of claim 10, wherein the high resolution, low light image has associated therewith a light level of less than ten lux.

12. An electronic device, comprising:
   an imager capturing a high resolution, low light image; and
   one or more processors operable with the imager, the one or more processors generating a high resolution, enhanced image from the high resolution, low light image using hybrid image enhancement by combining a low light enhancement model of a deep neural network component trained through deep learning of semantic enhancement for images photographed in a low light environment that generates a low resolution, enhanced image and a mathematical joint upsampling model component that generates the high resolution, enhanced image by:
      downsampling the high resolution, low light image to obtain a low resolution, low light image;
      inputting the low resolution, low light image into the low light enhancement model of the deep neural network component; and
      inputting the high resolution, low light image, the low resolution, low light image, and the low resolution, enhanced image into the mathematical joint upsampling model component; and
   the one or more processors using the mathematical joint upsampling model component to scale two two-dimensional transformational matrices mathematically linking pixels in the low resolution, low light image to other pixels in the low resolution, enhanced image to have a spatial resolution equal to that of the high resolution, low light image.

13. The electronic device of claim 12, further comprising a display, the one or more processors presenting the high resolution, enhanced image on the display.

14. The electronic device of claim 12, wherein the high resolution, enhanced image reveals information visibly hidden in the high resolution, low light image.

15. The electronic device of claim 12, the one or more processors using the mathematical joint upsampling model component to apply the two two-dimensional transformational matrices after scaling to original pixels of the high resolution, low light image to generate the high resolution, enhanced image.

16. The electronic device of claim 15, wherein the high resolution, low light image has a spatial resolution of between three and five times another spatial resolution of both the low resolution, low light image and the low resolution, enhanced image.

17. The electronic device of claim 16, wherein the high resolution, low light image has associated therewith a light level of less than ten lux.

18. A method of optimizing a low light image enhancement process in an electronic device, the method comprising:

optimizing, using one or more processors of the electronic device, a maximum semantic recovery from a high resolution, low light image using a minimum processor loading of the one or more processors within a predefined low light enhancement process duration time by:

performing a first portion of the low light image enhancement process using a low light enhancement model of a deep neural network component trained through deep learning of semantic enhancement for images photographed in a low light environment; and performing a second portion of the low light image enhancement process using a sharpness-preserving mathematical model.

19. The method of claim 18, wherein the sharpness-preserving mathematical model generates the a high resolution, enhanced image by performing an upsampling process on matrices linking an input and an output of the low light enhancement model and applying the matrices to pixels of the high resolution, low light image.

20. The method of claim 19, wherein the first portion of the low light image enhancement process enhances one or more of true colors, edges, or brightness level of the input.

* * * * *